United States Patent [19]

Immler

[11] 4,270,166
[45] May 26, 1981

[54] CIRCUIT ARRANGEMENT FOR PRODUCING A REGULATED HIGH DC VOLTAGE FROM A THREE-PHASE CURRENT

[75] Inventor: Josef Immler, Puchheim, Fed. Rep. of Germany

[73] Assignee: Siemens Aktiengesellschaft, Berlin & Munich, Fed. Rep. of Germany

[21] Appl. No.: 12,380

[22] Filed: Feb. 15, 1979

[30] Foreign Application Priority Data

Mar. 3, 1978 [DE] Fed. Rep. of Germany ....... 2809275

[51] Int. Cl.³ .......................................... H02P 13/24
[52] U.S. Cl. ........................................ 363/89; 363/61; 323/223
[58] Field of Search .................................. 363/59-61, 363/124-127, 80, 89; 323/8, 81

[56] References Cited

U.S. PATENT DOCUMENTS

| 3,259,830 | 7/1966 | Öjelid | 363/61 |
| 3,320,509 | 5/1967 | Guglielmi | 323/81 X |
| 3,708,687 | 1/1973 | Tatham | 323/8 X |
| 3,708,741 | 1/1973 | Hekimian | 363/60 |
| 3,733,540 | 5/1973 | Hawkins | 363/89 |
| 3,867,684 | 2/1975 | Ginsberg et al. | 363/80 |
| 4,099,227 | 7/1978 | Liptak | 363/126 |

OTHER PUBLICATIONS

S. W. Wagner, "Current Supply of Electronic Circuits Apparatus", R. V. Deckers, Publisher G. Schenck, Hamburg, 1964, pp. 182-183, 466-467.
B. U. Tietze et al, "Semiconductor Circuit Technology", Publisher Springer-Verlag, Berlin-Heidelberg, New York, 1971, p. 37.

Primary Examiner—J. D. Miller
Assistant Examiner—Peter S. Wong
Attorney, Agent, or Firm—Hill, Van Santen, Steadman, Chiara & Simpson

[57] ABSTRACT

A circuit arrangement for producing a regulated high dc voltage from three-phase current utilizes a three-phase current bridge rectifier which is connected to lines for the three phases of the three-phase current, and a first circuit having a transistor is arranged parallel to the three-phase current bridge rectifier circuit and includes a base for receiving a control current. In each line of a three-phase supply, a series resistance is connected in front of the connection points of the lines of the three-phase current bridge rectifier.

10 Claims, 5 Drawing Figures

000
CIRCUIT ARRANGEMENT FOR PRODUCING A REGULATED HIGH DC VOLTAGE FROM A THREE-PHASE CURRENT

BACKGROUND OF THE INVENTION

1. Field of the Invention

The present invention relates to a circuit arrangement for producing a regulated high dc voltage from three-phase current in which a three-phase bridge rectifier circuit is connected to the three phases of a three-phase current supply and a circuit is connected in parallel with the output of the three-phase bridge rectifier circuit and includes a transistor whose base is connected to receive a control current.

2. Description of the Prior Art

Obtaining a dc voltage from three-phase current with the aid of a three-phase bridge rectifier circuit is known in the art. In this connection, one may refer to S. W. Wagner, Current Supply of Electronic Circuits and Apparatus, R. V. Deckers publisher G. Schenk, Hamburg, 1964, p. 182. It is furthermore known in the art to maintain constant voltage with the aid of a parallel regulating circuit. An example of such a parallel regulator is apparent from the aforementioned publication at page 466.

SUMMARY OF THE INVENTION

The object of the present invention is to provide a circuit arrangement by means of which, a pursuant to the utilization of a three-phase current bridge rectifier, a high regulated dc voltage for a load can be obtained from three-phase current.

The above object is achieved in that, in each line for a phase of the three-phase current, a resistance is inserted before the connection points of the lines with the three-phase bridge rectifier.

The control currents supplied to a parallel-connected transistor can be a dc current. In order to produce the high dc voltage, an additional three-phase rectifier circuit can advantageously be arranged behind the connection points of the three-phase rectifier circuit with the lines for the three phases. At the output of the second three-phase current rectifier circuit a high, regulated dc voltage is obtained. The regulation of the high dc voltage proceeds with the aid of the resistances in the lines for the phases in which a voltage drop is produced which is dependent upon the current via the resistances, the three-phase current rectifier circuit, and the circuit which contains the transistor.

In a further embodiment of the invention, the circuit arranged parallel to the three-phase current bridge rectifier circuit can consist of a series-connection which includes a resistance and the transistor. The control current supplied to the base of the transistor can then be a pulsed-shaped ac current. It is advantageous to arrange, parallel to the resistance of the circuit, a voltage multiplier at the output of which the high dc voltage results. The resistance of the circuit is here an ohmic resistance. Therefore, in this embodiment, the transistor of the circuit is rendered conductive during a period duration of the control current, and subsequently is blocked. Therefore, the stabilization of the high dc voltage is supported with the aid of the series resistances, and additionally with the aid of the parallel regulator function by way of the resistance of the circuit.

It is advantageous to arrange a second circuit at the connection point of the resistance with the transistor of the switching circuit. With the aid of this second circuit, a high dc voltage can then be obtained whose polarity is opposite to the polarity of the dc voltage which is produced in accordance with the above-described circuit. To this end, the second circuit is constructed such a capacitor is connected to the connection point between the resistance and the transistor of the first circuit. The other connection terminal of this first transistor is connected to a first diode, a second diode, and to a third capacitor. The first and the second diodes are here oppositely poled. The other terminal of the first diode is connected by way of a resistance to a fixed potential. The other terminal of the second diode, by way of contrast, is connected via a second capacitor to the other terminal of the first diode. In addition, there is connected to the other connection of the second diode a third diode whose terminal is connected to the other terminal of the third capacitor, and whose second connection forms the output of the additional circuit. The second and third diodes are similarly poled. Therefore, at the output of the second circuit, a dc voltage opposite in polarity relative to the first embodiment is produced which can be increased in value by way of a voltage multiplier.

In a further embodiment of the invention, the impedance of the first circuit can be an inductance. The power dissipation is thereby reduced. In this embodiment, a capacitor can be arranged at the connection point of the inductance with the transistor, the capacitor having a terminal which is additionally connected by way of a diode to the inductance and another terminal which is connected to an additional voltage source. In this manner, with the aid of the capacitor, the voltage occurring at the output of the three-phase current bridge rectifier can be added to the voltage of the voltage source. Advantageously, the voltage source is realized by a diode circuit having series-connected diodes wherein the connection points of the individual diodes of the diode circuit are connected, by way of capacitors, to the lines for the three phases of the three-phase current. The other connection terminal of each of these capacitors is then connected to the connection point of two series-connected diodes, one of which is arranged at the output of the diode circuit and the other connection terminal of the other diode being interconnected with the capacitor which is connected to the transistor.

If a pulse-shaped ac current is utilized as the control current for the transistor of the first circuit, it is then expedient to either change the pulse width or the frequency of the ac current in dependence upon the high dc voltage at the output of the circuit arrangement. The regulating function of the transistor is thus adjusted corresponding to the value of the high dc voltage.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
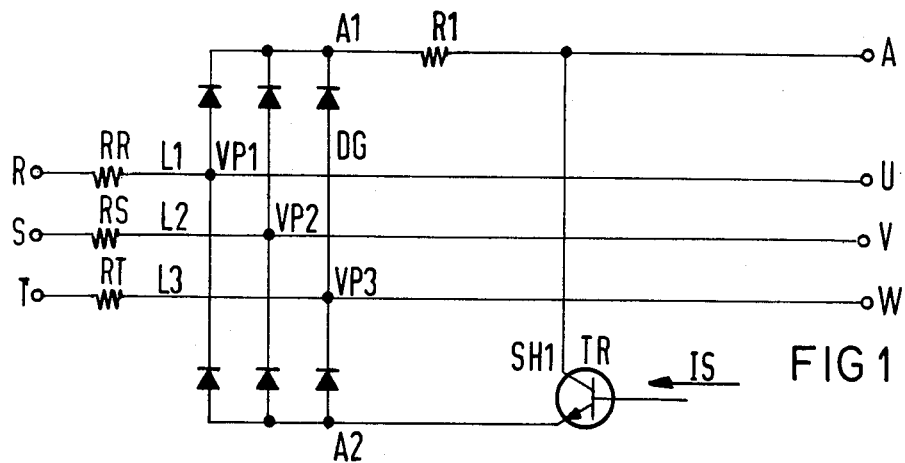
FIG. 1 is a schematic circuit diagram of a first embodiment of the invention.

Referring to FIG. 1, the three lines for the three phases of the three-phase current are referenced L1, L2 and L3. The input of the line L1 is referenced R, the input of the line L2 is referenced S, and the input of the line L3 is referenced T. A three-phase current bridge rectifier circuit DG is connected to the three lines L1, L2 and L3 and is represented on the drawing as a plurality of diodes. The bridge rectifier is provided with a pair of output terminals A1 and A2. A first circuit SH1 is connected in parallel to the output terminals A1 and A2 in the exemplary embodiment of FIG. 1 and only contains a transistor TR which includes an emitter connected to the output terminal A2, a collector connected to the output terminal A1 by way of a resistance R1, and a base for receiving a control current IS. The lines L1, L2 and L3 for the phases of the three-phase current are further extended to terminals U, V and W. The resistance R1 is provided for current limitation.

Between the terminals R, S and T of the lines L1, L2 and L3, and connection points VP1, VP2 and VP3 of the lines L1, L2 and L3 with the bridge rectifier DG respective resistances are, RR, RS and RT are serially connected. With the aid of these series resistances, the voltage on the lines L1, L2 and L3 is stabilized. In order to explain the circuit arrangement of FIG. 1, it is assumed that the amplitude of the ac voltage on the line L1 is the most positive. The diode of the bridge rectifier DG connected to the connection point VP1 is then rendered conductive, whereas the diodes of the bridge rectifier connected to the connection point VP2 are blocked. Therefore, current flows by way of the series resistance RR, the diode of the bridge rectifier, the resistance R1 and the transistor TR. The value of this current is also dependent upon the degree of conductivity of the transistor TR. The voltage at the output U therefore depends upon the current which produces a corresponding voltage drop by way of the series resistance RR. If the amplitude of the ac voltage at the input R of the line R1 becomes greater, the current via the bridge rectifier DG and the transistor TR also becomes greater; there therefore results a greater voltage drop at the series resistance RR. The voltage at the output U of the line L1 is thus stabilized. The operation described for the voltage on the line L1 occurs in a corresponding manner on the remaining lines L2 and L3. Therefore, through the circuit arrangement, the voltages occurring at the outputs U, V and W are maintained at a value which is independent of undesired voltage fluctuations at the inputs R, S and T.

In order to produce a high dc voltage, a three-phase bridge rectifier corresponding to the three-phase current bridge rectifier DG is now connected to the outputs U, V and W. At the output of the three-phase current bridge rectifier, a dc voltage is then tapped whose value can be increased by way of a voltage multiplier. Such a voltage multiplier is readily apparent, for example, from U. Tietze, TH. Schenk, Semiconductor Circuit Technology, Springer-Publications, Berlin, Heidelberg, New York, 1971, p. 37.

Therefore, in the embodiment of the invention illustrated in FIG. 1, a voltage stabilization is achieved by virtue of the fact that, by varying the collector current through the transistor TR, a different voltage drop is produced at the series resistances RR, RS and RT.

Figure 2:
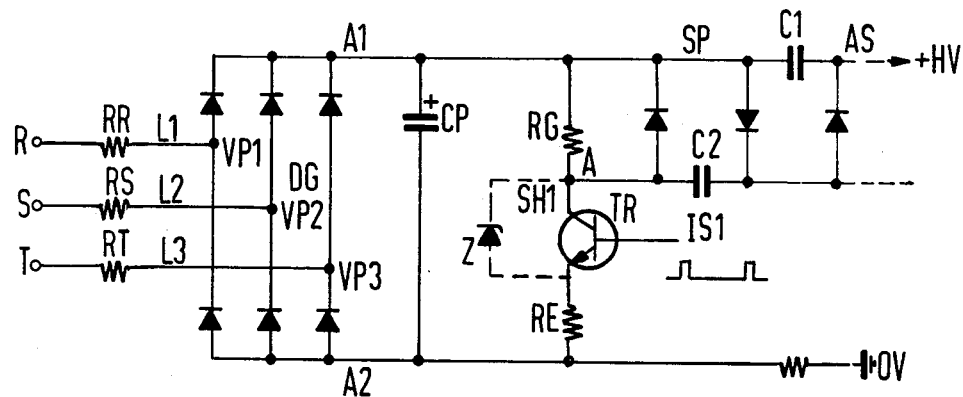
FIG. 2 is a schematic circuit diagram of a second embodiment of the invention.
Figure 3:
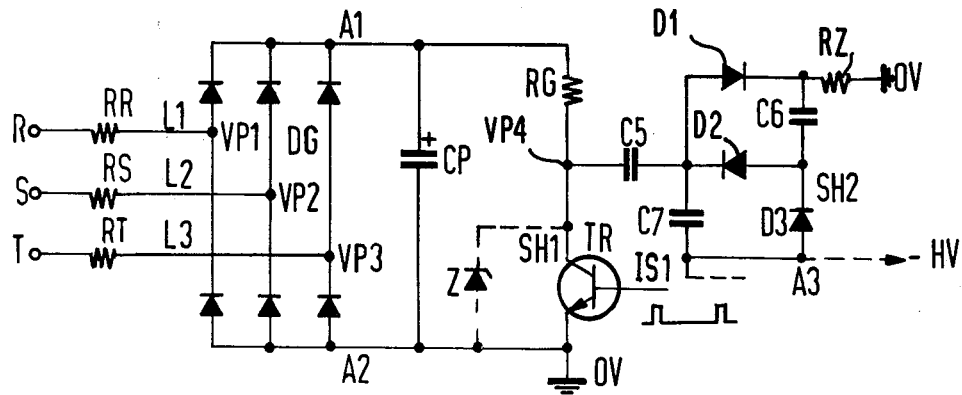
FIG. 3 is a schematic circuit diagram of a third embodiment of the invention.
Figure 4:
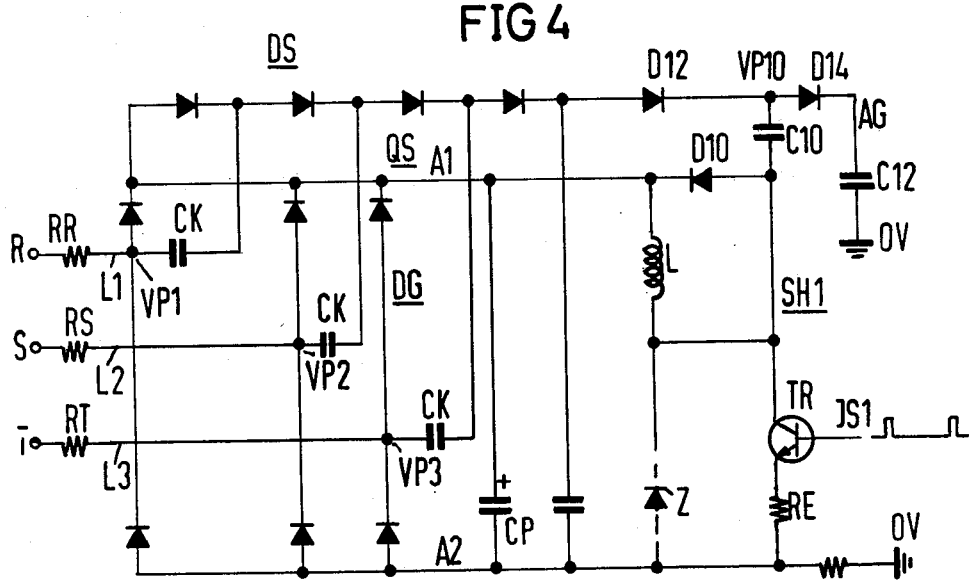
FIG. 4 is a schematic circuit diagram of a fourth embodiment of the invention.

The stabilization according to FIG. 1 is further improved with the circuit arrangement of FIGS. 2-4. Components which are similar to those illustrated in FIG. 1 are provided with the same reference characters.

Referring to the circuit arrangement illustrated in FIG. 2, the resistance R1 is omitted, whereas the first circuit SH1 now comprises an ohmic resistance RG and the transistor TR. This embodiment of the invention, the control current IS is a pulse-shaped ac current. A voltage multiplier SP of known construction is connected in parallel with the resistance RG of the first circuit SH1. At the output AS of the voltage multiplier SP a high dc voltage HV of, for example, 2000 volt is tapped. There is further arranged, in parallel with the three-phase current bridge rectifier DG, a capacitor CP which acts as a buffer for the mains transients.

In addition to the stabilization of the dc voltage with the aid of the series resistances RR, RS and RT discussed in connection with FIG. 1, a further stabilization occurs in the circuit arrangement of FIG. 2 through the parallel regulating function of the circuit SH1 in connection with the voltage multiplier SP. Moreover, no additional three-phase current bridge circuit is required for the production of the high dc voltage HV.

The function of the circuit arrangement illustrated in FIG. 2 will be explained, assuming that the ac voltage at the point R has the greatest positive amplitude value. In this case, the diode of the bridge rectifier DG connected to the point VP1 is conductive and a voltage up, for example, 1000 volt occurs at the output A1 of the bridge rectifier DG. This voltage is also connected to the capacitor C1 and to the capacitor C2 of the voltage multiplier SP. It is assumed that the transistor TR is conductive. Therefore, on the one side of the capacitor C2, a voltage of 1000 volt is connected; on the other side of the capacitor C2, a voltage of approximately 0 volt is connected. If the transistor TR is now blocked, the voltage on the other side of the capacitor C2 is increased by way of the resistance RG from approximately 0 volt to approximately 1000 volt. The one side of the capacitor C2 follows this voltage change which is added up at the output AS of the voltage multiplier SP to the previously given voltage of 1000 volt. At the output AS of the voltage multiplier SP there thus occurs a high dc voltage HV whose value is twice as great as the value of the voltage at the point A1 of the bridge rectifier DG. By altering the pulse width of the pulse-shaped ac current IS1 at the input of the transistor TR, or by altering the frequency of the pulses of the ac current IS1, respectively, an undesired interference of the ac voltages at the inputs R, S and T of the circuit arrangement can be compensated. For the control current IS1 has changed, corresponding to the value of the dc voltage HV, either in frequency or in pulse width, and hence the duration of conductivity of the transistor TR is changed. In addition to the just-described regulation of the output voltage HV, a further stabilization occurs by way of the series resistances RR, RS and RT, according to the principle described in relation to FIG. 1.

A resistance RE is connected between the emitter of the transistor TR and the output A2 of the bridge rectifier and serves for current limitation purposes, while a Zener diode Z illustrated in broken lines, serves the purpose of protection of the transistor TR.

FIG. 3 illustrates a further embodiment of the invention in which, instead of a positive dc voltage HV, a negative dc voltage −HV is produced. The first circuit SH1 is constructed corresponding to the first circuit SH1 of FIG. 2 with the resistance RE for current limitation omitted.

At a connection point VP4 between the resistance RG and the transistor TR, a capacitor C5 is connected. At the other connection of the capacitor C5, two diodes D1, D2 and additional capacitor C7 are connected. The diode D1 is connected with its other terminal, by way of a resistance RZ, to a fixed potential of, for example, 0 volt. The diode D2 is connected to a capacitor C6 and a diode D3. The capacitor C6 is further connected to the diode D1. The other connection of the diode D3 forms the output A3 of the circuit SH2 and is also connected to the capacitor C7.

It is assumed that the transistor TR is blocked. Then, at the connection point VP4, approximately the same voltage is present as at the output A1 of the bridge rectifier DG. The other side of the capacitor C5 is connected approximately to 0 volt since, in this instance, the diode D1 is conductive. If the transistor TR is rendered conductive, then the voltage at the connection point VP4 changes from, for example, 1000 volt to 0 volt. This voltage jump is transferred by way of the capacitor C5 whose other side is changed from 0 volt to −1000 volt. This negative voltage reaches the output of the circuit SH2 by way of the diodes D2 and D3. Simultaneously, the capacitor C7 is recharged to −1000 volt so that the negative dc voltage −HV also remains when the charge reversal operations of the capacitors are terminated.

At the output A3 of the second circuit SH2, there thus results a negative dc voltage −HV. At the output A3 of the circuit SH2 a voltage multiplier can be connected in order to further increase the value of the dc voltage −HV.

Also in the case of the circuit arrangement of FIG. 3, through stabilization of the dc voltage −HV, two mutually reinforcing principles are utilized. The first principle is based on the change in the voltage drop via the series resistances RR, RS and RT, while the other principle relates to the parallel regulator function with the aid of the first circuit SH1.

In the fourth embodiment of the circuit arrangement, illustrated in FIG. 4, a first circuit SH1 is arranged parallel to the output terminals A1, A2 of the three-phase current bridge rectifier DG. In this embodiment, the circuit SH1 comprises a series connection of an inductance L and the transistor TR. In addition, an emitter resistance RE is included for purpose of current limitation. The advantage of the inductance is that the power loss of the inductance is less than the power loss of an ohmic resistance. A capacitor C10 is connected to the collector of the transistor at one terminal and has its other terminal connected to a voltage source QS. With the aid of the capacitor C10, the voltage of the voltage source QS can be increased by the value of the voltage at the output A1 of the bridge rectifier DG. A free-running diode D10 is connected between the inductance L and the capacitor C10.

The circuit arrangement of FIG. 4 functions as follows. At the output A1 of the bridge rectifier DG, a voltage of, for example, 1000 volt is connected. The transistor TR is rendered conductive. Then, the pontential on the one side of the capacitor C10 lies at approximately 0 volt. If the transistor TR is now blocked, the voltage at the output A1 which is the capacitor C10 by way of the inductance L. One side of the capacitor C10 is changed from 0 volt to approximately 1000 volt; a corresponding voltage also occurs on the other side of the capacitor C10. The voltage existing at the output of the voltage source QS is then increased by, for example, 1000 volt.

The voltage source QS can be realized with the aid of a diode circuit DS. The diode circuit DS comprises a plurality of series-connected diodes. A portion of the connection point of two diodes, respectively, is connected by way of a respective capacitor CK to the connection points VP1, VP2 and VP3 of the bridge rectifier. The voltage at the output AG of the diodes circuit DS is therefore obtained from the voltages at the inputs R, S and T. The additional voltage via the capacitor C10 is supplied to the diode circuit DS at the connection point VP10 of two diodes D12, and D14. A capacitor C12 is connected at the output AG of the diode circuit and has its other side connected to a fixed potential, for example, 0 volt.

In the circuit arrangements of FIGS. 2–4, the additional stabilization of the high dc voltage HV via the series resistances RR, RS and RT can also be omitted. Then the stabilization of the dc voltage HV proceeds only by way of the partial regulation provided through the circuit SH1. Furthermore, it is also not necessary to utilized three-phase current according to the described principle for the purpose of producing a high dc voltage HV. It is also possible to utilize a single ac voltage for the production of the high dc voltage HL. Then, the three-phase current rectifier DG is omitted and is replaced by a simple rectifier circuit.

Figure 5:
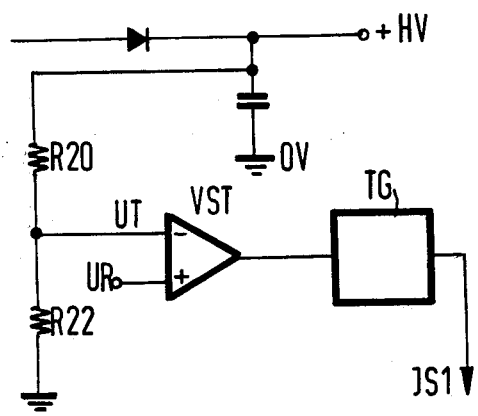
FIG. 5 is a schematic circuit diagram of a circuit arrangement for producing the control current for the transistor of the first circuit.

Referring to FIG. 5, a circuit arrangement is illustrated for producing the control current IS1. With this technique, one proceeds from the regulated high dc voltage HV. The latter is connected to the input of an amplifier VST by way of a voltage divider which comprises a resistance R20 and a resistance R22. The other input of the amplifier VST is connected to a reference voltage UR which indicates a nominal value. The output voltage of the amplifier VST is therefore dependent on the extent of deviation of the voltage UT of the voltage divider from the reference voltage UR. The output of the amplifier VST is connected to a clock pulse generator TG. The clock pulse generator TG then produces the control current IS1 whose frequency, or pulse duration, respectively, is dependent upon the voltage emitted by the amplifier VST. The control current IS1 is supplied to the transistors TR of FIGS. 2–4.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for producing a regulated high dc voltage from three-phase current, comprising:
    a three-phase current bridge rectifier including three connection points and a high voltage output;
    a control circuit including a transistor having a collector-emitter path connected in parallel with said bridge rectifier and a base for receiving a pulse-shaped ac control current, and an impedance connected between said three-phase current bridge rectifier and said transistor; and first, second and third resistors, each of said resistors connected to a respective connection point and adapted for connection to a respective phase of a three-phase supply.

2. The circuit arrangement of claim 1, wherein said impedance is an ohmic resistance.

3. The circuit arrangement of claim 1, comprising: a voltage multiplier connected in parallel to said impedance.

4. The circuit arrangement of claim 1, including an output circuit which comprises:

a first capacitor having a first terminal connected to the junction of said transistor and said impedance, and having a second terminal;

a first diode connected to said second terminal of said first capacitor;

a fourth resistor connecting said first diode to a first fixed potential;

a second diode connected to said second terminal of said first capacitor;

a second capacitor connected between said first and second diodes;

a third capacitor connected to said second terminal of said first capacitor and forming said output; and a third diode connected between said output and the junction of said second capacitor and said second diode, said second and third diodes poled in the same direction and said first diode poled opposite thereto as viewed from said first capacitor.

5. The circuit arrangement of claim 1, wherein said impedance comprises an inductance.

6. The circuit arrangement of claim 5, further comprising:

an additional voltage source connected to said inductance;

a diode connected to said inductance; and a capacitor having a first terminal connected to the said inductance via said diode and a second terminal connected to said additional voltage source.

7. The circuit arrangement of claim 6, wherein said additional voltage source comprises:

a diode circuit including a plurality of serially-connected diodes with junctions therebetween; and a plurality of additional capacitors connecting respective ones of said junctions of said serially-connected diodes with respective connection points of said three-phase current bridge rectifier, the first-mentioned capacitor connected to one of said junctions.

8. The circuit arrangement of claim 1, comprising:

circuit means connected between said output and said base of said transistor for producing said control current.

9. The circuit arrangement of claim 8, wherein said circuit means comprises:

means responsive to the high voltage to vary the pulse width of said control current.

10. The circuit arrangement of claim 8, wherein said circuit means comprises:

means responsive to the high voltage to vary the frequency of said control current.

* * * * *